(12) United States Patent
Liang et al.

(10) Patent No.: US 10,481,327 B2
(45) Date of Patent: Nov. 19, 2019

(54) PHOTODETECTOR SYSTEM INCLUDING A WAVEGUIDE AND A TUNED REFLECTOR

(71) Applicant: Hewlett Packard Enterprise Development LP, Houston, TX (US)

(72) Inventors: Di Liang, Santa Barbara, CA (US); Zhihong Huang, Palo Alto, CA (US); Geza Kurczveil, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 190 days.

(21) Appl. No.: 15/109,847

(22) PCT Filed: Jan. 29, 2014

(86) PCT No.: PCT/US2014/013596
§ 371 (c)(1),
(2) Date: Jul. 6, 2016

(87) PCT Pub. No.: WO2015/116063
PCT Pub. Date: Aug. 6, 2015

(65) Prior Publication Data
US 2016/0334576 A1   Nov. 17, 2016

(51) Int. Cl.
*G02B 6/12* (2006.01)
*G02B 6/124* (2006.01)
(Continued)

(52) U.S. Cl.
CPC ........ *G02B 6/12007* (2013.01); *G01J 1/0488* (2013.01); *G01J 1/44* (2013.01);
(Continued)

(58) Field of Classification Search
CPC ................ G02B 6/12007; G02B 6/122; G02B 6/12004; G02B 6/124; G02B 2006/12138;
(Continued)

(56) References Cited

U.S. PATENT DOCUMENTS 7,148,463 B2   12/2006  Mahajan et al.
7,613,369 B2   11/2009  Witzens et al.
(Continued)

FOREIGN PATENT DOCUMENTS

WO   WO-2004079829   9/2004

OTHER PUBLICATIONS

Hsu, S.H., Reflectively Coupled Waveguide Photodetector for High Speed Optical Interconnection, Dec. 2, 2010, Sensors, vol., 10, pp. 10863-10875.
(Continued)

*Primary Examiner* — Tony Ko
(74) *Attorney, Agent, or Firm* — Nolte Intellectual Property Law Group

(57) ABSTRACT

One example includes a photodetector system. The system includes a waveguide photodetector into which an input optical signal comprising a frequency band of interest is provided and from which the input optical signal is absorbed to generate an output signal that is indicative of an intensity of the input optical signal. The system also includes a reflector coupled to the waveguide photodetector and which is to reject frequencies outside of the frequency band of interest and to reflect the frequency band of interest back into the waveguide photodetector.

14 Claims, 4 Drawing Sheets

(51) Int. Cl.
*G01J 1/04* (2006.01)
*G01J 1/44* (2006.01)
*G02B 6/122* (2006.01)

(52) U.S. Cl.
CPC ............. *G02B 6/122* (2013.01); *G02B 6/124* (2013.01); *G02B 6/12004* (2013.01); *G02B 2006/12104* (2013.01); *G02B 2006/12138* (2013.01)

(58) Field of Classification Search
CPC .. G02B 2006/12104; G01J 1/44; G01J 1/0488
See application file for complete search history.

(56) References Cited

U.S. PATENT DOCUMENTS

| | | | |
|---|---|---|---|
| 7,683,397 B2* | 3/2010 | Sarid | H01L 31/1075 257/186 |
| 2007/0104441 A1 | 5/2007 | Ahn et al. | |
| 2008/0073744 A1 | 5/2008 | Masini et al. | |
| 2009/0121305 A1 | 5/2009 | Pan et al. | |
| 2011/0135314 A1 | 6/2011 | Tolstikhin et al. | |
| 2012/0155232 A1 | 6/2012 | Schreck et al. | |
| 2013/0039614 A1 | 2/2013 | Shubin et al. | |

OTHER PUBLICATIONS

International Search Report & Written Opinion, dated Oct. 27, 2014, PCT Patent Application No. PCT/US2014/013596, 12 pages.
Lu, Z. et al., "Broadband Silicon Photonic Directional Coupler Using Asymmetric-waveguide Based Phase Control," 2015, pp. 3795-3808, https://www.osapublishing.org/DirectPDFAccess/5E0494B4-9A27-B429-2356672A80DFE3A4_311817/oe-23-3-3795.pdf?da=1&id=311817&seq=0&mobile=no.
Syms, R. et al., "Optical Guided Waves and Devices," Sep. 1, 1992, http://www3.imperial.ac.uk/pls/portallive/docs/1/2475913.PDF.
rphotonics.com, "RP Photonics Encyclopedia: Bragg Mirrors," Apr. 19, 2016, https://web.archive.org/web/20160419033105/http://www.rp-photonics.com/bragg_mirrors.html.

* cited by examiner

PHOTODETECTOR SYSTEM INCLUDING A WAVEGUIDE AND A TUNED REFLECTOR

BACKGROUND

Optical communications have become more prevalent as the demand for high-speed communication and processing has increased. Optical communications typically implement a laser for providing an optical signal, and at least one photodetector for converting the optical signal to an electric signal that can correspond to an intensity of the optical signal. As an example, a photodetector can be configured as a waveguide photodetector that can absorb photons associated with the optical signal propagating through a waveguide therein, such as via a material that has a high absorption coefficient, such that the waveguide photodetector can have a length dimension that facilitates greater absorption. As another example, a waveguide photodetector can be configured as an optical resonance cavity that is configured to resonate a specific wavelength and associated harmonics.

DETAILED DESCRIPTION

Figure 1:
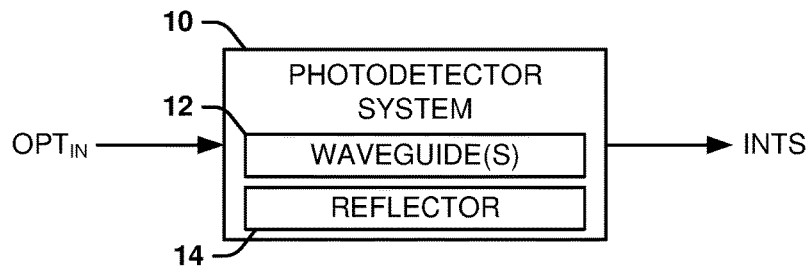
FIG. 1 illustrates an example of a photodetector system.

FIG. 1 illustrates an example of a photodetector system 10. As an example, the photodetector system 10 can be implemented in a variety of optical signal applications, such as an optical communication system. The photodetector system 10 is configured to receive an optical input signal $OPT_{IN}$ and to provide an electrical output signal INTS that is indicative of an intensity of the optical input signal $OPT_{IN}$.

As an example, the photodetector system 10 can be configured as a waveguide photodetector. In the example of FIG. 1, the photodetector system 10 includes at least one waveguide 12 through which the optical input signal $OPT_{IN}$ propagates. For example, the waveguide(s) 12 can be substantially surrounded by a photodetector that is formed from a material having a substantially high absorption coefficient, such that the photons of the optical input signal $OPT_{IN}$ can be absorbed to generate the output signal INTS. As a first example, the waveguide(s) 12 can include a single waveguide that extends through the photodetector material. As a second example, the waveguide(s) 12 can include a first waveguide and a second waveguide that each extend through the photodetector material and are arranged in parallel with respect to each other. In the second example, the first and second waveguides can have a length that can correspond to a single beat length or an integer multiple thereof with respect to a frequency band of interest.

The photodetector system 10 also includes a reflector 14. The reflector 14 can be coupled to one of the waveguide(s) 12, such as, in one example, opposite an input waveguide. As an example, the reflector 14 can be integrated with the photodetector material of the photodetector system 10. The reflector 14 can be fabricated in any of a variety of ways such that the reflector 14 is tuned to reflect a frequency band of interest associated with the optical input signal $OPT_{IN}$. For example, the reflector 14 can be configured as a distributed Bragg reflector (DBR) with shallow etching, a teardrop reflector, and/or a high-order grating reflector (e.g., including a sub-wavelength grating or including a long period length). Thus, frequencies outside of the frequency band of interest can be rejected by the reflector 14, such that the frequencies outside of the frequency band of interest can pass through the reflector 14 without being reflected. As a result, the frequency band of interest can be reflected back into the waveguide(s) 12 while the frequencies outside of the frequency band of interest are filtered and removed from the photodetector system 10 via the reflector 14. Accordingly, the photodetector system 10 can substantially increase a signal-to-noise ratio (SNR) of the output signal INTS in providing an indication of the intensity of the frequency band of interest in the optical input signal $OPT_{IN}$.

Figure 2:
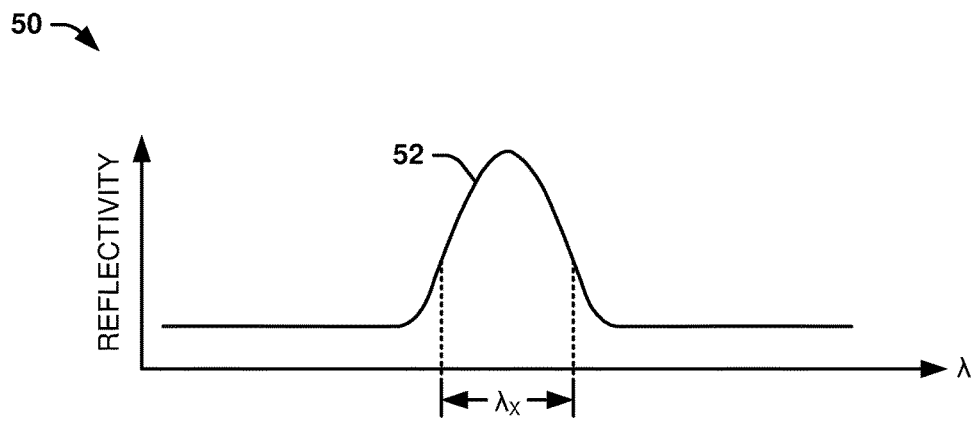
FIG. 2 illustrates an example of a graph of reflectivity.

FIG. 2 illustrates an example of a graph 50 of reflectivity. The graph 50 demonstrates reflectivity on the vertical axis and wavelength λ on the horizontal axis. The graph 50 demonstrates a reflectivity curve 52 that corresponds to a reflectivity of the reflector 14. The reflectivity curve 52 includes a substantially Gaussian portion of increased reflectivity that corresponds to a frequency band $\lambda_X$. As an example, the frequency band $\lambda_X$ can correspond to the frequency band of interest of the optical input signal $OPT_{IN}$. The reflector 14 can thus be substantially highly reflective of the frequency band of interest $\lambda_X$, and can exhibit a significantly reduced reflectivity with respect to the remaining frequencies outside of the frequency band of interest $\lambda_X$. Thus, as described herein, the frequency band of interest $\lambda_X$ can correspond to a substantially narrow frequency band that includes a range of frequencies that can be greater than a single frequency (e.g., and associated harmonics), and which is within a range of frequencies that are rejected by the reflector 14. While the frequency band of interest $\lambda_X$ is demonstrated as substantially Gaussian, it is to be understood that the reflector 14 can exhibit increased reflectivity for the frequency band of interest $\lambda_X$ in a variety of other shapes, such as a repeated Lorenzian arrangement or a substantial plateau of increased reflectivity.

Figure 3:
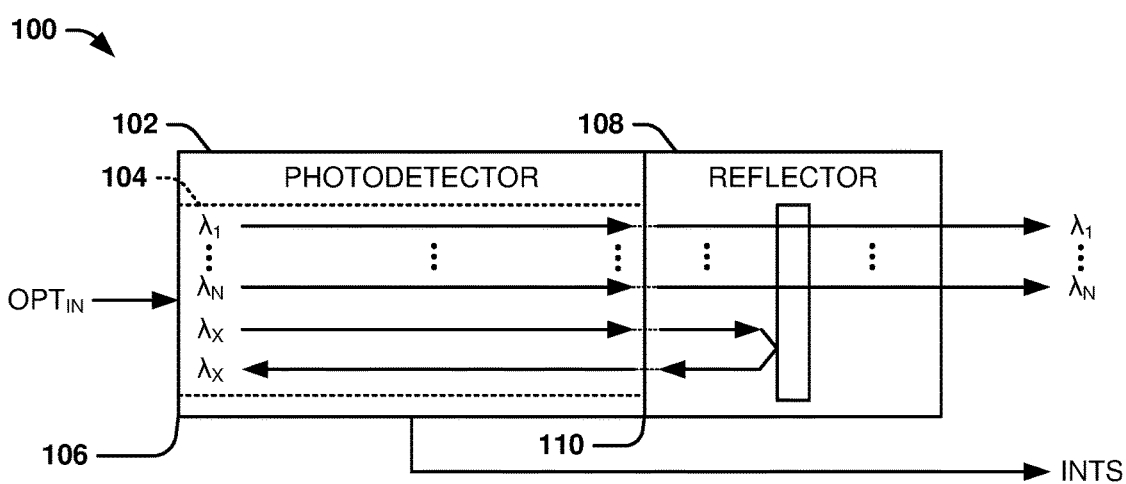
FIG. 3 illustrates an example of a waveguide photodetector system.

FIG. 3 illustrates another example of a waveguide photodetector system 100. The photodetector system 100 can correspond to the photodetector system 10 in the example of FIG. 1. In the example of FIG. 3, the waveguide photodetector system 100 includes a waveguide photodetector 102 through which a waveguide 104 extends. The input optical signal $OPT_{IN}$ is provided into the waveguide 104 at a first end 106 of the waveguide 104, such as via an input waveguide (not shown). The input optical signal $OPT_{IN}$ includes a frequency spectrum that includes a frequency band of interest $\lambda_X$ and a set of frequencies $\lambda_1$ through $\lambda_N$ outside of the frequency band of interest $\lambda_X$. As an example, the waveguide photodetector 102 can be formed from a material that has a substantially high absorption coefficient. Therefore, the waveguide photodetector 102 can absorb photons of the input optical signal $OPT_{IN}$ as it propagates through the waveguide 104 to generate the electrical output signal INTS.

The photodetector system 100 also includes a reflector 108 that is coupled to the waveguide 104 at a second end 110 of the waveguide 104 opposite the first end 106 into which the input optical signal $OPT_{IN}$ is provided. As an example, the reflector 108 can be integrated with the waveguide photodetector 102 (e.g., during fabrication). The reflector 108 is configured to reflect the frequency band of interest $\lambda_X$ and to reject the frequencies $\lambda_1$ through $\lambda_N$. In the example of FIG. 3, the frequencies $\lambda_1$ through $\lambda_N$ is demonstrated as passing through the reflector 108, and thus continues to propagate past the reflector 108, while the frequency band of interest $\lambda_X$ is demonstrated as being reflected from the reflector 108. Therefore, the frequency band of interest $\lambda_X$ is demonstrated as being reflected back into the waveguide 104 to propagate from the second end 110 to the first end 106 of the waveguide 104. As a result, the frequency band of interest $\lambda_X$ propagates through the waveguide photodetector 102 in two optical paths, with the first path being from the first end 106 to the second end 110 as part of the optical input signal $OPT_{IN}$ and the second path being from the second end 110 to the first end 106 after having been reflected by the reflector 108. However, the frequencies $\lambda_1$ through $\lambda_N$ only propagates through the waveguide photodetector 102 a single time from the first end 106 to the second end 110 as part of the optical input signal $OPT_{IN}$ before being rejected by the reflector 108.

Accordingly, the waveguide photodetector 102 absorbs the frequency band of interest $\lambda_X$ along a longer effective distance through the waveguide 104 than the frequencies $\lambda_1$ through $\lambda_N$, resulting in a substantially increase in SNR of the output signal INTS in providing an indication of the intensity of the frequency band of interest $\lambda_X$ (e.g., twice the SNR of typical photodetector systems) for improved responsivity and sensitivity. The waveguide photodetector 102 therefore provides an enhance responsivity and sensitivity while maintaining a short physical length for a compact footprint and high-speed operation. Additionally, because the reflector 170 is tuned to reflect the frequency band of interest $\lambda_X$ as a frequency band, as demonstrated in the example of FIG. 3, and not a single wavelength and associated harmonics, the waveguide photodetector system 150 can be effective for a wider range of frequency of the optical input signal $OPT_{IN}$ than a typical optical resonator photodetector system that implements distributed Bragg reflector (DBR) mirrors in an optical cavity. Furthermore, the waveguide photodetector system 150 is a passive photodetector device to provide substantially low power consumption that can occupy a substantially smaller package than typical waveguide photodetector systems by increasing sensitivity based on multiple propagation paths of the frequency band of interest $\lambda_X$ through a shorter waveguide distance, as described herein.

Figure 4:
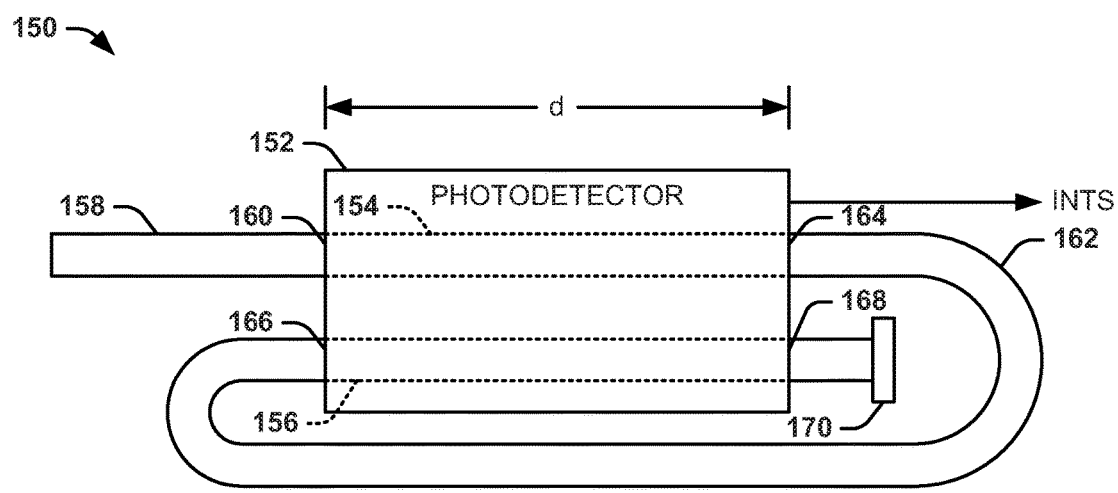
FIG. 4 illustrates another example of a waveguide photodetector system.

FIG. 4 illustrates another example of a waveguide photodetector system 150. The photodetector system 150 can correspond to the photodetector system 10 in the example of FIG. 1. In the example of FIG. 4, the waveguide photodetector system 150 includes a waveguide photodetector 152 through which a first waveguide 154 and a second waveguide 156 each extend. Similar to as described previously regarding the example of FIG. 3, the waveguide photodetector 152 can be formed from a material that has a substantially high absorption coefficient. Therefore, the waveguide photodetector 152 can absorb photons of the input optical signal $OPT_{IN}$ as it propagates through the first and/or second waveguides 154 and 156 to generate the electrical output signal INTS.

The first and second waveguides 154 and 156 are arranged parallel with respect to each other and can each have a length of "d" corresponding to a length of the waveguide photodetector 152. Thus, the waveguide photodetector 152 can be configured as a directional coupler, such that the optical signal $OPT_{IN}$ can oscillate between the first and second waveguides 154 and 156. As an example, the length "d" can correspond to one beat length of the frequency band of interest $\lambda_X$, such that the distance "d" corresponds to a distance at which the frequency band of interest $\lambda_X$ can shift from one of the first and second waveguides 154 and 156 to the other of the first and second waveguides 154 and 156, and then shift back again to the original one of the first and second waveguides 154 and 156. However, because the beat length parameter is wavelength dependent, the frequency band of interest $\lambda_X$ and the frequencies $\lambda_1$ through $\lambda_N$ can have different beat lengths. Therefore, the distance "d" may correspond to a greater or lesser than one beat length for the frequencies $\lambda_1$ through $\lambda_N$. Therefore, the waveguide photodetector 152 may shift the frequency band of interest $\lambda_X$ and the frequencies $\lambda_1$ through $\lambda_N$ separately along the length "d" of the first and second waveguides 154 and 156.

In the example of FIG. 4, the first waveguide 154 is coupled to an input waveguide 158 at a first end 160 and to a transition waveguide 162 at a second end 164. The transition waveguide 162 extends from the second end 164 of the first waveguide 154 along the length "d" of the waveguide photodetector 152 to a first end 166 of the second waveguide 156. The second waveguide 156 is also coupled at a second end 168 to a reflector 170. The input waveguide 158, the transition waveguide 162, and the reflector 170 can be integrated with the waveguide photodetector 102 (e.g., during fabrication). Similar to as described previously, the reflector 170 is configured to reflect the frequency band of interest $\lambda_X$ and to reject the frequencies $\lambda_1$ through $\lambda_N$. Therefore, the frequency band of interest $\lambda_X$ can be reflected back into the waveguide photodetector 152 to be provided through the waveguide photodetector 152 in multiple paths, while the frequencies $\lambda_1$ through $\lambda_N$ can be rejected from the waveguide photodetector 152. Accordingly, the waveguide photodetector 152 absorbs the frequency band of interest $\lambda_X$ along a longer effective distance through the waveguide 154 than the frequencies $\lambda_1$ through $\lambda_N$, resulting in a substantially increase in SNR of the output signal INTS in providing an indication of the intensity of the frequency band of interest $\lambda_X$ relative to typical waveguide photodetector systems (e.g., four times the SNR of typical photodetector systems) for improved responsivity and sensitivity.

Figure 5:
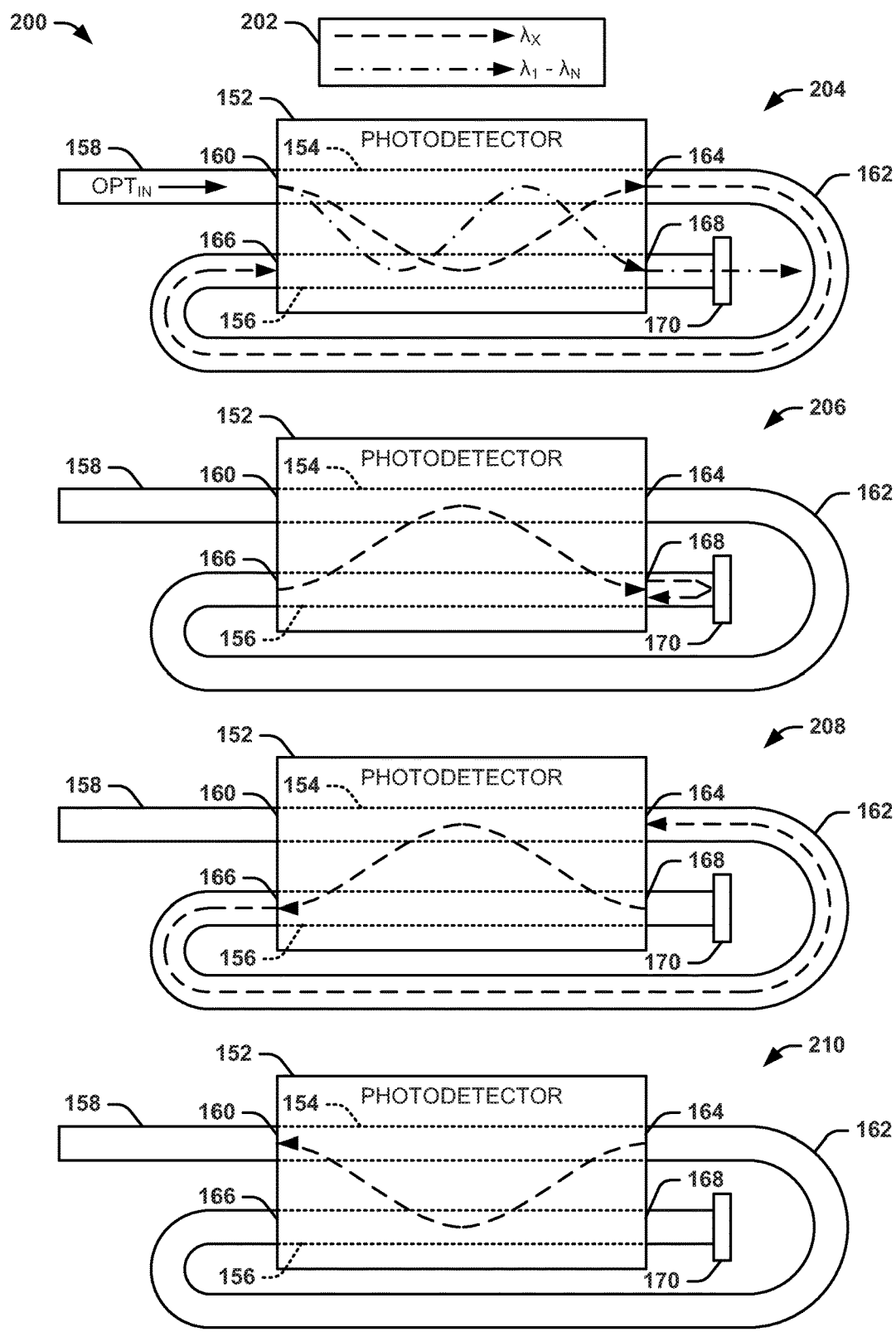
FIG. 5 illustrates an example diagram of propagation of an optical signal through a waveguide photodetector system.

FIG. 5 illustrates an example diagram 200 of propagation of the optical input signal $OPT_{IN}$ through the waveguide photodetector system 150. Because the diagram 200 demonstrates the waveguide photodetector system 150, like reference numbers are used in the example of FIG. 5 as are used in the example of FIG. 4. The diagram 200 demonstrates the propagation paths of the frequency band of interest $\lambda_X$ (dashed line) and the frequencies $\lambda_1$ through $\lambda_N$ (dashed and dotted line), as demonstrated by a legend 202, in separate sequential stages.

The diagram 200 demonstrates a first propagation stage 204, in which the optical input signal $OPT_{IN}$ provided at the first end 160 of the first waveguide 154 via the input waveguide 158. The optical input signal $OPT_{IN}$ includes both the frequency band of interest $\lambda_X$ and the frequencies $\lambda_1$ through $\lambda_N$. In the first propagation stage 204, the frequency band of interest $\lambda_X$ and the frequencies $\lambda_1$ through $\lambda_N$ each oscillate between the first and the second waveguides 154 and 156. As described previously in the example of FIG. 4, the waveguide photodetector 152 has a length "d" that can correspond to one beat length of the frequency band of interest $\lambda_X$, but that the frequency band of interest $\lambda_X$ and the frequencies $\lambda_1$ through $\lambda_N$ can have different beat lengths.

Therefore, in the first propagation stage 204, the frequency band of interest $\lambda_X$ has a first propagation path from the first end 160 of the first waveguide 154 to the second end 164 of the first waveguide 154 along the length "d" via a shift from the first waveguide 154 to the second waveguide 156 and back to the first waveguide 154. The frequency band of interest $\lambda_X$ then propagates through the transition waveguide 162 from the second end 164 of the first waveguide 154 to the first end 166 of the second waveguide 156. Additionally, in the first propagation stage 204, the frequencies $\lambda_1$ through $\lambda_N$ has a first propagation path from the first end 160 of the first waveguide 154 to the second end 168 of the second waveguide 156 along the length "d". During the first propagation path of the frequencies $\lambda_1$ through $\lambda_N$, the frequencies $\lambda_1$ through $\lambda_N$ is demonstrated as shifting from the first waveguide 154 to the second waveguide 156, back to the first waveguide 154, then back to the second waveguide 156 based on having a beat length that is less than the beat length of the frequency band of interest $\lambda_X$. Upon being provided to the second end 168 of the second waveguide 156, the frequencies $\lambda_1$ through $\lambda_N$ propagates to the reflector 170 and is rejected by the reflector 170 (e.g., by passing through the reflector 170). Thus, the frequencies $\lambda_1$ through $\lambda_N$ exits the waveguide photodetector system 150 after a single propagation path.

In a second propagation stage 206, the frequency band of interest $\lambda_X$ is provided at the first end 166 of the second waveguide 156 via the transition waveguide 162. Therefore, the frequency band of interest $\lambda_X$ has a second propagation path from the first end 166 of the second waveguide 156 to the second end 168 of the second waveguide 156 along the length "d" via a shift from the second waveguide 156 to the first waveguide 154 and back to the second waveguide 156. The frequency band of interest $\lambda_X$ then propagates to the reflector 170 and is reflected back to the second end 168 of the second waveguide 156.

In a third propagation stage 208, the frequency band of interest $\lambda_X$ is provided at the second end 168 of the second waveguide 156 via the reflector 170. Therefore, the frequency band of interest $\lambda_X$ has a third propagation path from the second end 168 of the second waveguide 156 to the first end 166 of the second waveguide 156 along the length "d" via a shift from the second waveguide 156 to the first waveguide 154 and back to the second waveguide 156. The frequency band of interest $\lambda_X$ then propagates through the transition waveguide 162 from the first end 166 of the second waveguide 156 to the second end 164 of the first waveguide 154.

In a fourth propagation stage 210, the frequency band of interest $\lambda_X$ is provided at the second end 164 of the first waveguide 154 via the transition waveguide 162. Therefore, the frequency band of interest $\lambda_X$ has a fourth propagation path from the second end 164 of the first waveguide 154 to the first end 160 of the first waveguide 154 along the length "d" via a shift from the first waveguide 154 to the second waveguide 156 and back to the first waveguide 154. The frequency band of interest $\lambda_X$ then propagates out of the first waveguide 154 into the input waveguide 158 and out of the waveguide photodetector system 150. Thus, in the example of FIG. 5, the frequency band of interest $\lambda_X$ propagates through the waveguide photodetector 152 in multiple paths via the reflector 170 and the transition waveguide 162, while the frequencies $\lambda_1$ through $\lambda_N$ is rejected from the waveguide photodetector 152 via the reflector 170. Accordingly, the waveguide photodetector 152 absorbs the frequency band of interest $\lambda_X$ along a longer effective distance through the waveguide 154 than the frequencies $\lambda_1$ through $\lambda_N$. In the example of FIG. 5, the frequency band of interest $\lambda_X$ propagates through the waveguide photodetector 152 four times relative to the single propagation of the frequencies $\lambda_1$ through $\lambda_N$ through the photodetector 152. As a result, the output signal INTS can have an SNR that is approximately four times that of a typical waveguide photodetector system in providing the indication of the intensity of the frequency band of interest $\lambda_X$.

Figure 6:
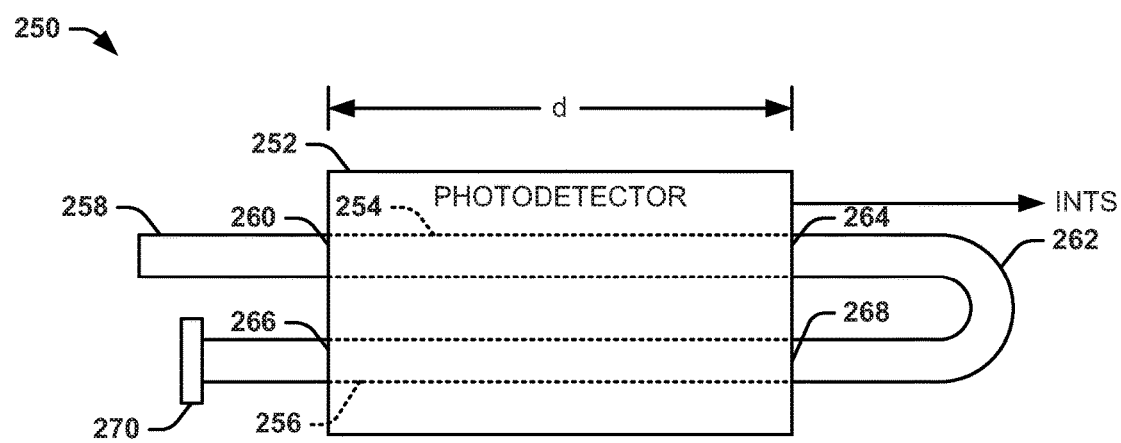
FIG. 6 illustrates yet another example of a waveguide photodetector system.

FIG. 6 illustrates yet another example of a waveguide photodetector system 250. The photodetector system 250 can correspond to the photodetector system 10 in the example of FIG. 1. In the example of FIG. 6, the waveguide photodetector system 250 includes a waveguide photodetector 252 through which a first waveguide 254 and a second waveguide 256 each extend. Similar to as described previously regarding the example of FIG. 3, the waveguide photodetector 252 can be formed from a material that has a substantially high absorption coefficient. Therefore, the waveguide photodetector 252 can absorb photons of the input optical signal $OPT_{IN}$ as it propagates through the first and/or second waveguides 254 and 256 to generate the electrical output signal INTS.

Similar to as described previously regarding the example of FIG. 4, the first and second waveguides 254 and 256 are arranged parallel with respect to each other and can each have a length of "d" corresponding to one beat length of the frequency band of interest $\lambda_X$. In the example of FIG. 6, the first waveguide 254 is coupled to an input waveguide 258 at a first end 260 and to a transition waveguide 262 at a second end 264. The transition waveguide 262 couples the second end 264 of the first waveguide 254 to a second end 268 of the second waveguide 256. The second waveguide 256 is also coupled at a first end 266 to a reflector 270. The input waveguide 258, the transition waveguide 262, and the reflector 270 can be integrated with the waveguide photodetector 202 (e.g., during fabrication). Similar to as described previously, the reflector 270 is configured to reflect the frequency band of interest $\lambda_X$ and to reject the frequencies $\lambda_1$ through $\lambda_N$. Therefore, the frequency band of interest $\lambda_X$ can be reflected back into the waveguide photodetector 252 to be provided through the waveguide photodetector 252 in multiple paths, while the frequencies $\lambda_1$ through $\lambda_N$ can be rejected from the waveguide photodetector 252.

Figure 7:
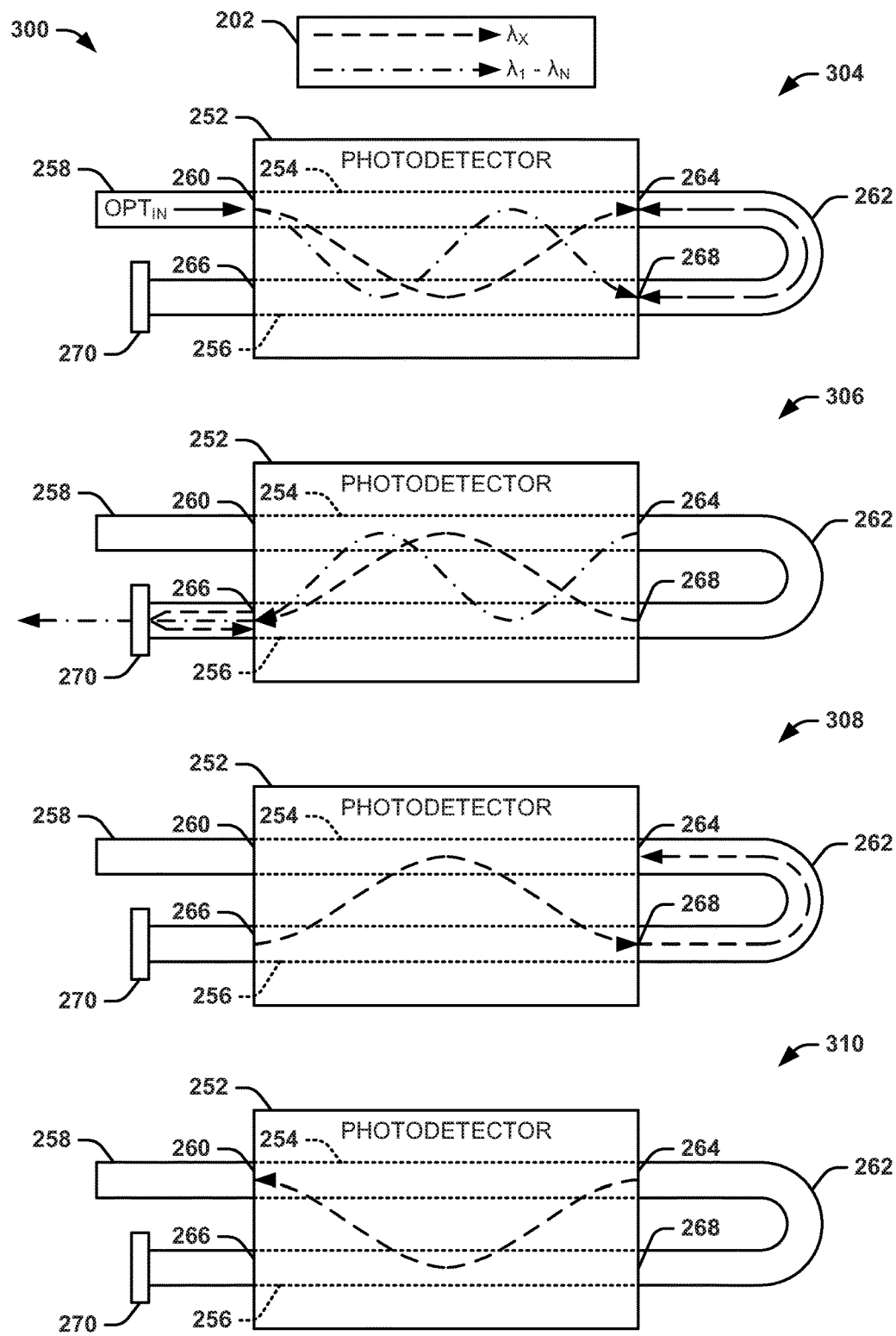
FIG. 7 illustrates an example diagram of propagation of an optical signal through a waveguide photodetector system.

FIG. 7 illustrates an example diagram 300 of propagation of the optical input signal $OPT_{IN}$ through the waveguide photodetector system 250. Because the diagram 300 demonstrates the waveguide photodetector system 250, like reference numbers are used in the example of FIG. 5 as are used in the example of FIG. 4. The diagram 300 demonstrates the propagation paths of the frequency band of interest $\lambda_X$ (dashed line) and the frequencies $\lambda_1$ through $\lambda_N$ (dashed and dotted line), as demonstrated by a legend 302, in separate sequential stages.

The diagram 300 demonstrates a first propagation stage 304, in which the optical input signal $OPT_{IN}$ provided at the first end 260 of the first waveguide 254 via the input waveguide 258. The optical input signal $OPT_{IN}$ includes both the frequency band of interest $\lambda_X$ and the frequencies $\lambda_1$ through $\lambda_N$. In the first propagation stage 304, the frequency band of interest $\lambda_X$ and the frequencies $\lambda_1$ through $\lambda_N$ each oscillate between the first and the second waveguides 254 and 256. As described previously in the example of FIG. 6, the waveguide photodetector 252 has a length "d" that can correspond to one beat length of the frequency band of interest $\lambda_X$, but that the frequency band of interest $\lambda_X$ and the frequencies $\lambda_1$ through $\lambda_N$ can have different beat lengths.

Therefore, in the first propagation stage 304, the frequency band of interest $\lambda_X$ has a first propagation path from the first end 260 of the first waveguide 254 to the second end 264 of the first waveguide 254 along the length "d" via a shift from the first waveguide 254 to the second waveguide 256 and back to the first waveguide 254. The frequency band of interest $\lambda_X$ then propagates through the transition waveguide 262 from the second end 264 of the first waveguide 254 to the second end 268 of the second waveguide 256. Additionally, in the first propagation stage 304, the frequencies $\lambda_1$ through $\lambda_N$ has a first propagation path from the first end 260 of the first waveguide 254 to the second end 268 of the second waveguide 256 along the length "d". During the first propagation path of the frequencies $\lambda_1$ through $\lambda_N$, the frequencies $\lambda_1$ through $\lambda_N$ is demonstrated as shifting from the first waveguide 254 to the second waveguide 256, back to the first waveguide 254, then back to the second waveguide 256 based on having a beat length that is less than the beat length of the frequency band of interest $\lambda_X$. Upon being provided to the second end 268 of the second waveguide 256, the frequencies $\lambda_1$ through $\lambda_N$ propagates through the transition waveguide 262 from the second end 264 of the second waveguide 256 to the second end 260 of the first waveguide 254.

In a second propagation stage 306, the frequency band of interest $\lambda_X$ is provided at the second end 268 of the second waveguide 256 via the transition waveguide 262. Therefore, the frequency band of interest $\lambda_X$ has a second propagation path from the second end 268 of the second waveguide 256 to the first end 266 of the second waveguide 256 along the length "d" via a shift from the second waveguide 256 to the first waveguide 254 and back to the second waveguide 256. The frequency band of interest $\lambda_X$ then propagates to the reflector 270 and is reflected back to the first end 266 of the second waveguide 256. Additionally, in the second propagation stage 306, the frequencies $\lambda_1$ through $\lambda_N$ has a second propagation path from the second end 264 of the first waveguide 254 to the first end 266 of the second waveguide 256 along the length "d". During the second propagation path of the frequencies $\lambda_1$ through $\lambda_N$, the frequencies $\lambda_1$ through $\lambda_N$ is demonstrated as shifting from the first waveguide 254 to the second waveguide 256, back to the first waveguide 254, then back to the second waveguide 256 based on having a beat length that is less than the beat length of the frequency band of interest $\lambda_X$. The frequencies $\lambda_1$ through $\lambda_N$ then propagates to the reflector 270 and is rejected by the reflector 270 (e.g., by passing through the reflector 270). Thus, the frequencies $\lambda_1$ through $\lambda_N$ exits the waveguide photodetector system 250 after the second propagation path.

In a third propagation stage 308, the frequency band of interest $\lambda_X$ is provided at the first end 266 of the second waveguide 256 via the reflector 270. Therefore, the frequency band of interest $\lambda_X$ has a third propagation path from the first end 266 of the second waveguide 256 to the second end 268 of the second waveguide 256 along the length "d" via a shift from the second waveguide 256 to the first waveguide 254 and back to the second waveguide 256. The frequency band of interest $\lambda_X$ then propagates through the transition waveguide 262 from the second end 268 of the second waveguide 256 to the second end 264 of the first waveguide 254.

In a fourth propagation stage 310, the frequency band of interest $\lambda_X$ is provided at the second end 264 of the first waveguide 254 via the transition waveguide 262. Therefore, the frequency band of interest $\lambda_X$ has a fourth propagation path from the second end 264 of the first waveguide 254 to the first end 260 of the first waveguide 254 along the length "d" via a shift from the first waveguide 254 to the second waveguide 256 and back to the first waveguide 254. The frequency band of interest $\lambda_X$ then propagates out of the first waveguide 254 into the input waveguide 258 and out of the waveguide photodetector system 250. Thus, in the example of FIG. 7, the frequency band of interest $\lambda_X$ propagates through the waveguide photodetector 252 in multiple (i.e., four) paths via the reflector 270 and the transition waveguide 262, while the frequencies $\lambda_1$ through $\lambda_N$ is rejected from the waveguide photodetector 252 via the reflector 270 after the second propagation path. Accordingly, the waveguide photodetector 252 absorbs the frequency band of interest $\lambda_X$ along a longer effective distance through the waveguide 254 than the frequencies $\lambda_1$ through $\lambda_N$.

In the example of FIG. 7, the frequency band of interest $\lambda_X$ propagates through the waveguide photodetector 252 four times relative to the two propagation paths of the frequencies $\lambda_1$ through $\lambda_N$ through the photodetector 252. As a result, the output signal INTS can have an SNR that is approximately twice that of a typical waveguide photodetector system in providing the indication of the intensity of the frequency band of interest $\lambda_X$. While the waveguide photodetector system 250 provides a decrease in SNR of the output signal INTS relative to the waveguide photodetector system 150 in the examples of FIGS. 4 and 5, the transition waveguide 262 is smaller in the photodetector system 250 than the transition waveguide 162 in the photodetector system 150. Therefore, the photodetector system 250 can be implemented in a smaller package than the photodetector system 150 for space savings.

It is to be understood that the waveguide photodetector systems 150 and 250 are not intended to be limited to the examples of FIGS. 4 and 5 and FIGS. 6 and 7, respectively. For example, the distance "d" can be tuned to provide varying oscillation of the frequency band of interest $\lambda_X$ and the frequencies $\lambda_1$ through $\lambda_N$ between the first and second waveguides 154 and 156 and the first and second waveguides 254 and 256. Therefore, the transition waveguides 162 and 262 and the reflectors 170 and 270 can be arranged at different ends of the first and second waveguides 154 and 156 and the first and second waveguides 254 and 256, respectively, to provide the multipath propagation of the frequency band of interest $\lambda_X$ relative to the frequencies $\lambda_1$ through $\lambda_N$ to provide the increased SNR of the output signal INTS. Accordingly, the waveguide photodetector systems 150 and 250 can be configured in a variety of ways.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:
1. A photodetector system comprising:
   a waveguide photodetector including:
      an input to receive an optical signal, the optical signal comprising frequencies within a first frequency band and a second frequency band; and an output to output an electrical output signal corresponding to the input optical signal;

a reflector coupled to the waveguide photodetector, the reflector to filter frequencies of the second frequency band such that the frequencies of the second frequency band pass through the reflector without being reflected and to reflect the frequencies of the first frequency band such that the frequencies of the first frequency band are reflected back into the waveguide photodetector to generate the electrical output signal; and a first waveguide coupled to the input and a second waveguide arranged substantially parallel with the first waveguide and coupled to the reflector, such that the input optical signal is to oscillate between the first and second waveguides.

2. The system of claim 1, wherein the first and second waveguides each have a length that is approximately equal to one beat length with respect to the first frequency band.

3. The system of claim 1, wherein the first waveguide is coupled to the input at a first end and to a transition waveguide at a second end, and wherein the second waveguide is coupled to the transition waveguide at a first end and to the reflector at a second end, wherein a first axis that extends from the first end to the second end of the first waveguide is parallel with a second axis that extends from the first end to the second end of the second waveguide.

4. The system of claim 3, wherein a sequential propagation path of the first frequency band through the waveguide photodetector comprises:
 a first path from the first end to the second end of the first waveguide to propagate through the transition waveguide;
 a second path from the first end to the second end of the second waveguide to be reflected by the reflector;
 a third path from the second end to the first end of the second waveguide to propagate through the transition waveguide; and
 a fourth path from the second end to the first end of the first waveguide.

5. The system of claim 3, wherein a sequential propagation path of the frequencies outside of the first frequency band through the waveguide photodetector comprises a path from the first end of the first waveguide to the second end of the second waveguide to be filtered by the reflector.

6. The system of claim 1, wherein the first waveguide is coupled to the input at a first end and to a transition waveguide at a second end, and wherein the second waveguide is coupled to the reflector at a first end and to the transition waveguide at a second end, wherein a first axis that extends from the first end to the second end of the first waveguide is parallel with a second axis that extends from the first end to the second end of the second waveguide.

7. The system of claim 6, wherein a sequential propagation path of the first frequency band through the waveguide photodetector comprises:
 a first path from the first end to the second end of the first waveguide to propagate through the transition waveguide;
 a second path from the second end to the first end of the second waveguide to be reflected by the reflector;
 a third path from the first end to the second end of the second waveguide to propagate through the transition waveguide; and
 a fourth path from the second end to the first end of the first waveguide.

8. The system of claim 6, wherein a sequential propagation path of the frequencies outside of the first frequency band through the waveguide photodetector comprises:
 a first path from the first end of the first waveguide to the second end of the second waveguide to propagate through the transition waveguide; and
 a second path from the second end of the first waveguide to the first end of the second waveguide to be filtered by the reflector.

9. A photodetector system comprising:
 a waveguide photodetector to receive an input optical signal and to generate a corresponding electrical output signal, the input optical signal comprising frequencies of a first frequency band and a second frequency band, the waveguide photodetector comprising:
  a first waveguide coupled to an input into which the input optical signal is received; and
  a second waveguide arranged substantially parallel with the first waveguide, such that the input optical signal oscillates between the first and second waveguides when passing therethrough;
 a transition waveguide that interconnects the first waveguide and the second waveguide; and
 a reflector coupled to the second waveguide and to filter frequencies of the second frequency band such that the frequencies of the second frequency band pass through the reflector without being reflected and to reflect the frequencies of the first frequency band such that the frequencies of the first frequency band are reflected back into the second waveguide to generate the corresponding electrical output signal.

10. The system of claim 9, wherein the first and second waveguides each have a length that is approximately equal to one beat length with respect to the first frequency band.

11. The system of claim 9, wherein the first waveguide is coupled to the input at a first end and to the transition waveguide at a second end, and wherein the second waveguide is coupled to the transition waveguide at a first end and to the reflector at a second end, wherein a first axis that extends from the first end to the second end of the first waveguide is parallel with a second axis that extends from the first end to the second end of the second waveguide.

12. The system of claim 9, wherein the first waveguide is coupled to the input at a first end and to a transition waveguide at a second end, and wherein the second waveguide is coupled to the reflector at a first end and to the transition waveguide at a second end, wherein a first axis that extends from the first end to the second end of the first waveguide is parallel with a second axis that extends from the first end to the second end of the second waveguide.

13. The system of claim 9, wherein the second frequency band has a different beat length than the first frequency band, such that the first frequency band propagates through the waveguide photodetector less times than the second frequency band before the second frequency band is filtered by the reflector.

14. A photodetector system comprising:
 a waveguide photodetector including:
  an input to receive an optical signal, the optical signal comprising frequencies within a first frequency band and a second frequency band; and
  an output to output an electrical output signal corresponding to the input optical signal;
 a reflector coupled to the waveguide photodetector, the reflector to filter frequencies of the second frequency band such that the frequencies of the second frequency band pass through the reflector without being reflected and to reflect the frequencies of the first frequency band such that the frequencies of the first frequency band are reflected back into the waveguide photodetector to generate the electrical output signal, wherein the waveguide photodetector comprises a waveguide comprising a first end coupled to the input and a second end coupled to the reflector, wherein a sequential propagation path of the first frequency band through the waveguide photodetector comprises a first path from the first end to the second end of the waveguide to be reflected by the reflector and a second path from the second end to the first end of the waveguide.

* * * * *